US008837444B2

(12) United States Patent
Noldus

(10) Patent No.: US 8,837,444 B2
(45) Date of Patent: Sep. 16, 2014

(54) SETTING UP A CALL FROM A NON-IMS TO AN IMS NETWORK WHEREBY THE GATEWAY INTERFACES THE HSS

(75) Inventor: Rogier Noldus, Goirle (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 86 days.

(21) Appl. No.: 13/141,903

(22) PCT Filed: Dec. 23, 2008

(86) PCT No.: PCT/EP2008/068234
§ 371 (c)(1),
(2), (4) Date: Jun. 23, 2011

(87) PCT Pub. No.: WO2010/072264
PCT Pub. Date: Jul. 1, 2010

(65) Prior Publication Data
US 2011/0255531 A1 Oct. 20, 2011

(51) Int. Cl.
 *H04W 4/00* (2009.01)
 *H04L 12/66* (2006.01)
 *H04L 12/28* (2006.01)
 *H04W 40/00* (2009.01)
 *H04M 7/12* (2006.01)
 *H04L 29/12* (2006.01)
 *H04L 29/06* (2006.01)

(52) U.S. Cl.
 CPC ............ *H04M 7/123* (2013.01); *H04M 7/1235* (2013.01); *H04L 61/1588* (2013.01); *H04L 29/12188* (2013.01); *H04L 65/1069* (2013.01); *H04L 61/1576* (2013.01); *H04L 65/1016* (2013.01); *H04L 29/12169* (2013.01)
 USPC ........ 370/338; 370/352; 370/401; 455/422.1; 455/433; 455/445

(58) Field of Classification Search
 USPC ........ 370/338, 352, 401; 455/422.1, 433, 445
 See application file for complete search history.

(56) References Cited

U.S. PATENT DOCUMENTS 7,602,762 B1 * 10/2009 Kauppinen et al. ........... 370/349
2006/0092925 A1 * 5/2006 Svensson et al. ............. 370/352

(Continued)

FOREIGN PATENT DOCUMENTS

WO WO 2007/068927 A 6/2007

OTHER PUBLICATIONS

"3rd Generation Partnership Project: Technical Specification Group Services and System Aspects; Architectural requirements (Release 8); 3GPP TS 23.221" ETSI Standards, LIS, Sophia Antipolis Cedex, France, No. V8.3.0, Dec. 16, 2008, pp. 1-40, XP002545829 ISSN: 0000-0001 "7.2. Domain selection for mobile terminated calls from the PSTN/CS domain".

*Primary Examiner* — Alpus H Hsu
*Assistant Examiner* — Yee Lam

(57) ABSTRACT

The application relates to a method for setting up a call from a non-IMS telecommunication network, comprising a Network Gateway Node (NGN), to a destination node in an IMS network. The method comprises the NGN interfaces a combined database node comprising a Home Location Register (HLR) and a Home Subscriber Server (HSS). The method further comprises routing the call to the destination node in the IMS network, of which address is determined by information received from the combined database node. The method further comprises sending, sending, in response to receiving an initial call setup request message, an information request message to the combined database node for obtaining routing information for the setup of the call, the information request message comprising an indicator indicating at least one type of response that the NGN is able to process.

17 Claims, 7 Drawing Sheets

(56) References Cited

U.S. PATENT DOCUMENTS

| | | | |
|---|---|---|---|
| 2008/0159276 A1* | 7/2008 | Kuusinen et al. | 370/356 |
| 2008/0160995 A1* | 7/2008 | Thiebaut et al. | 455/433 |
| 2008/0160996 A1* | 7/2008 | Li et al. | 455/433 |
| 2008/0186921 A1* | 8/2008 | Long et al. | 370/331 |
| 2010/0110992 A1* | 5/2010 | Hu et al. | 370/328 |
| 2010/0153567 A1* | 6/2010 | Lu et al. | 709/229 |
| 2011/0028130 A1* | 2/2011 | Swaminathan et al. | 455/414.1 |

* cited by examiner

SETTING UP A CALL FROM A NON-IMS TO AN IMS NETWORK WHEREBY THE GATEWAY INTERFACES THE HSS

TECHNICAL FIELD

The invention relates generally to a telecommunications system, such as a fixed telecommunication system or a mobile telecommunication system, wherein services for a called party are handled by an Internet Protocol Multimedia Subsystem (IMS) network. More particularly, the invention facilitates a method and a node for setting up a call from a non-IMS network to a destination node in an IMS network, the destination node serving a called terminal.

BACKGROUND

Third Generation Networks (3G networks) such as the Universal Mobile Telecommunications System (UMTS) and the Code Division Multiple Access (CDMA) 2000 system provide high-speed wireless internet access to mobile users over a wide coverage area. For 3G networks the IP Multimedia Subsystem (IMS) has been defined to provide cellular access to telephony and multimedia services. The IMS uses packet-switched based technology, in particular the Internet Protocol (IP) for offering services. The strength of IMS is the offering of enhanced services, for example multimedia services combining voice and data. Further, the usage of an IP-network as a single underlying standard allows an easy and fast service deployment.

Terminals for 2nd generation networks (2G networks) like Global System for Mobile communications networks (GSM networks) and for 3rd generation networks like UMTS do not support IMS technology with the Session Initiation Protocol (SIP) as the signalling protocol. The former holds specifically for the case that the 2G or 3G terminal uses circuit switched (CS) technology for call establishment. Operators however want to give these 2G and 3G terminals access to their advanced IMS services.

Cooperation between 2G or 3G with IMS is known to be realized via an overlay system which allows 2G or 3G terminals, which do not support SIP, to make use of IMS based services when calling, when being called, or during a call.

When a call setup request is established for a GSM subscriber who has the terminating call service in IMS, the call setup request message, i.e. the so-called Integrated Services Digital Network (ISDN) User Part (ISUP)-Initial Address Message (ISUP-IAM) for that subscriber is routed to the Gateway Mobile Switching Center (GMSC) of the provider of the called subscriber. The called subscriber is identified by its so-called Mobile Station Integrated Services Digital Network Number (MSISDN). After obtaining needed information, e.g. routing information, Intelligent Network (IN) service invocation information etc., for the called terminal from the Home Location Register (HLR), the GMSC uses the information to determine how to proceed with the call setup request. If the HLR returns a Terminating call CAMEL Subscription Information code (T-CSI code) indicating that an IN service must be invoked, then the GMSC invokes a Service Control Point (SCP), which supports routing the call to the IMS network. This is done by providing by the SCP a Network Routing Number (NRN) to the GMSC. The GMSC routes the call setup request message to the Media Gateway Control Function (MGCF) that interfaces the core network with the IMS network. The NRN is used to select an appropriate MGCF and the MSISDN is used to identify the called terminal or subscriber. The MGCF sends a SIP-Invite message derived from the ISUP-IAM to a predefined Interrogating Call Session Control Function (I-CSCF).

The I-CSCF has the task of locating the Serving Call Session Control Function (S-CSCF), where the called terminal identified by the SIP Uniform Resource Identifier (SIP-URI) is registered. Therefore the I-CSCF contacts the Home Subscriber Server (HSS) in the IMS domain to obtain the S-CSCF address. The I-CSCF forwards the call to the S-CSCF, and the S-CSCF handles the call. The S-CSCF address and the I-CSCF address have either the format of an IP address (e.g. 183.212.17.12) or of a host name (e.g. s-cscf1.ims.operator.se).

As described above, the GMSC performs during call-setup the tasks of contacting the HLR, obtaining a roaming number, and of invoking IN service for the call, if needed. In the IMS network, the I-CSCF and the C-CSCF are involved in the call-setup. The I-CSCF has the task of contacting the HSS to get the routing address for routing the call setup request message to a serving node like the S-CSCF node. The S-CSCF node has the task of invoking services for the call to the IMS subscriber and to route the call to the destination terminal.

It can be concluded from the above description that the routing of a call setup request from a terminal in a non-IMS network to a destination node in an IMS network, the destination node serving the called terminal causes unnecessary intensive network signaling between nodes in the telecommunication system. Furthermore, this unnecessary network signaling between the nodes in the telecommunication system results in additional delay in the setting up of calls and leads to less efficient use of IMS nodes.

Thus, there is a need for an improved method and node for routing a call setup request from a terminal in a non-IMS network to a terminal having its services implemented in an IMS network.

SUMMARY

It is an object of the present invention to provide a method and a node for reducing network signalling between nodes in a telecommunications system during the set-up of a call from a non-Internet Protocol Multimedia Subsystem (non-IMS) telecommunication network to a destination node in an IMS network, wherein the destination node serves a called terminal.

This object is achieved by the teaching of the independent claims.

The invention proposes a method in a telecommunication system for setting up a call from a non-IMS telecommunication network comprising a Network Gateway Node (NGN) to a destination node in an IMS network, wherein the destination node serves a called terminal. The NGN interfaces a combined database node comprising a Home Location Register (HLR) and a Home Subscriber Server (HSS), wherein the NGN routes the call to the destination node in the IMS network, of which the address is determined by information received from the combined database node.

The invention further proposes an NGN for operating in a non-IMS telecommunication network for setting up a call towards a destination node in an IMS network, the destination node serving a called terminal. The NGN comprises a Gateway Mobile Switching Centre (GMSC) function and a Media Gateway Control Function (MGCF) wherein the NGN comprises a first network interface to a telecommunication network for receiving call setup request messages. The NGN further comprises a second network interface to a telecommunication network for sending an IMS type setup request message, a combined database node interface to a combined database node which comprises an HLR and an HSS for requesting routing information and receiving response messages, and a processor for determining based on the received response message an address for routing the IMS type call setup request message to the destination node in the IMS network.

The invention also proposes a method for supporting setting up a call from a non-IMS, telecommunication network comprising a NGN, to a destination node in an IMS network, the destination node for serving a called terminal of a subscriber. The NGN interfaces a combined database node comprising an HLR and an HSS. Furthermore the combined database node comprises a subscriber profile associated with the called terminal. The combined database node performs the steps of receiving an information request message comprising an identification of the called terminal for obtaining routing information for supporting the setup of the call. Furthermore the combined database node performs the steps of determining at least one capability of the NGN and subscriber information from the subscriber profile, generating a response message under consideration of the determined at least one capability of the NGN and the determined information from the subscriber profile, and sending the response message to the NGN.

The invention further proposes a combined database node for supporting setting up a call from a non-IMS, telecommunication network comprising a NGN, to a destination node in an IMS network, the destination node for serving a called terminal of a subscriber. The combined database node comprises an interface towards the NGN. The combined database node further comprises an HLR and an HSS, a subscriber profile associated with the called terminal, means for receiving an information request message comprising an identification of the called terminal, for requesting and obtaining routing information, means for determining at least one capability of the NGN and determining subscriber profile information, means for generating a response message under consideration of the determined at least one capability of the NGN and the determined subscriber profile information, and means for sending the response message to the NGN.

It shall be understood in context with the described invention that an IMS subscriber may have one or more terminals. Hence, when a call is established to a 'terminal' of an IMS subscriber, there is in fact a call established to the IMS subscriber as such. The call to the IMS subscriber may be offered, by the aforementioned destination node, to one or some or all of the subscriber's terminals, depending, among other, on which terminals are registered in the IMS network at that moment.

Further embodiments are described in the dependent claims.

According to an embodiment of the proposed method, the NGN executes the steps of receiving an initial call setup request message requesting a setup of the call. The initial call setup request message, e.g. Integrated Services Digital Network (ISDN) User Part (ISUP)-Initial Address Message (ISUP-IAM) comprises an identification of the called terminal. The NGN sends, in response to the receiving of the initial call setup request message, an information request message to a combined database node for obtaining routing information for the setup of the call. On receiving a response message that comprises routing information for routing the call to the destination node, the NGN determines based on the response message an address for routing an IMS type call setup request message to the destination node in the IMS network. Furthermore, the NGN generates the IMS type call setup request message under consideration of at least one of the determined addresses and the initial call setup request message, and finally sends the IMS type call setup request message to the destination node in the IMS network, the destination node serving the called terminal and identified by the determined address for routing.

This embodiment advantageously decreases the number of database node accesses that have to be performed in order to obtain the address of the destination node in the IMS network serving the called terminal. Instead of one database node access by the GMSC and another database node access by the I-CSCF for obtaining routing information for determining the serving node in the IMS network, only one combined database node access by only one node supplies the required routing information. Furthermore, as fewer nodes are involved also less delay is introduced in the setting up of a call.

Advantageously, the NGN sends to the combined database node an information request message that comprises an indicator indicating at least one type of response that the NGN is able to process, e.g. an S-CSCF capability information or an S-CSCF address.

On receiving a response message comprising the S-CSCF capabilities information, the NGN processes the S-CSCF capability information to select an S-CSCF node from a preconfigured list of S-CSCF nodes that is able to support the required capabilities for the call, and wherein the address for routing is the address of the selected S-CSCF node. On receiving a response message comprising the S-CSCF address the NGN processes the received information to route an IMS type call setup request message to a destination node in the IMS network, the destination node identified by the address of the S-CSCF node.

According to another embodiment, the NGN comprises a GMSC, operatively connected to a MGCF, and to the combined database node comprising an HLR and an HSS. In this embodiment the GMSC receives an initial call setup request message requesting a setup of the call, wherein the initial call setup request message comprises an identification of the called terminal. In response to the receiving of the initial call setup request message, the GMSC sends an information request message to a combined database node, for obtaining routing information for the setup of the call. After receiving in response to the information request message, a response message comprising routing information for routing the call to the destination, the GMSC determines based on the response message an address for routing an ISUP-IAM type call setup request message to the MGCF. Finally it generates the ISUP-IAM type call setup request message under consideration of at least one of the determined addresses and the initial call setup request message and sends the ISUP-IAM type call setup request message to the MGCF.

As described for the NGN, this embodiment advantageously decreases the number of database node accesses that have to be performed in order to obtain the address of the destination node in the IMS network serving the called terminal. Instead of one database node access by the GMSC and another database node access by the I-CSCF for obtaining routing information for determining the serving node in the IMS network, only one combined database node access by only one node supplies the required routing information. Furthermore, as fewer nodes are involved also less delay is introduced in the setting up of a call.

On receiving a response message comprising the S-CSCF capabilities information, the GMSC processes the S-CSCF capability information to select an S-CSCF node from a preconfigured list of S-CSCF nodes that is able to support the required capabilities for the call, and wherein the step of sending uses the address of the selected S-CSCF node.

On receiving a response message comprising the S-CSCF address the GMSC processes the received information and wherein the step of sending uses the address of the S-CSCF node.

In the embodiment where the NGN comprises a GMSC operatively connected to a MGCF, the MGCF executes the steps of receiving an ISUP-IAM type call setup request message from the GMSC for setting up a call to a destination node, generating an IMS type call setup request message under consideration of the received ISUP-IAM type call setup request message, and sending the IMS type call setup request message to the destination node in the IMS network, the destination node serving the called terminal. In an embodiment the destination node serving the called terminal is an S-CSCF node.

In the embodiment of the method for supporting the setting up a call from a non-IMS, telecommunication network comprising a NGN, to a destination node in an IMS network, the destination node for serving a called terminal of a subscriber, the combined database node determines from the received information whether the called terminal is an IMS subscriber. If the called terminal is not an IMS subscriber normal call handling will take place, that is, the combined database node sends e.g. a Mobile Station Roaming Number, MSRN or a Terminating Call Camel Subscription Information, T-CSI, code to the NGN.

If it is determined that the called terminal is an IMS subscriber, the combined database node will before generating the response message determine whether the combined database node provides an S-CSCF address of the destination node. Furthermore, if it is determined that the combined database node provides an S-CSCF address of the destination node, the combined database node will before generating the response message determine whether the at least one capability of the NGN indicates that the NGN comprises an integrated GMSC-MGCF.

If it is determined that the combined database node does not provide an S-CSCF address of the destination node, the combined database node will before generating the response message determine whether it is configured to select an S-CSCF address for the destination node.

Then, if it is determined that the combined database node is configured to provide an S-CSCF address of the destination node, the combined database node will before generating the response message determine whether the at least one capability of the NGN indicates that the NGN comprises an integrated GMSC-MGCF.

If it is determined that the at least one capability of the NGN indicates that the NGN comprises an integrated GMSC-MGCF, the combined database node will before generating the response message include the S-CSCF address (e.g. IP address=183.212.17.12 or host name=s-cscf1.ims.operator.se) in the response message.

Furthermore, if it is determined that the at least one capability indicates that the NGN does not comprise an integrated GMSC-MGCF, the combined database node will before generating the response message convert the S-CSCF address to a Network Routing Number (NRN) and include the NRN in the response message. If it is determined that the combined database node is not configured to provide an S-CSCF address of the destination node, the combined database node will before generating the response message determine whether the at least one capability indicates that the NGN is configured to receive S-CSCF capabilities.

Furthermore, if it is determined that the NGN is configured to receive S-CSCF capabilities, the combined database node will before generating the response message include the required S-CSCF capabilities in the response message. If it is determined that the NGN is not configured to receive S-CSCF capabilities, the combined database node will before generating the response message include the default NRN in the response message.

BRIEF DESCRIPTION OF THE DRAWINGS

The invention is described in detail with reference to the following figures.

DETAILED DESCRIPTION

The invention will now be described with reference to the figures.

Figure 1:
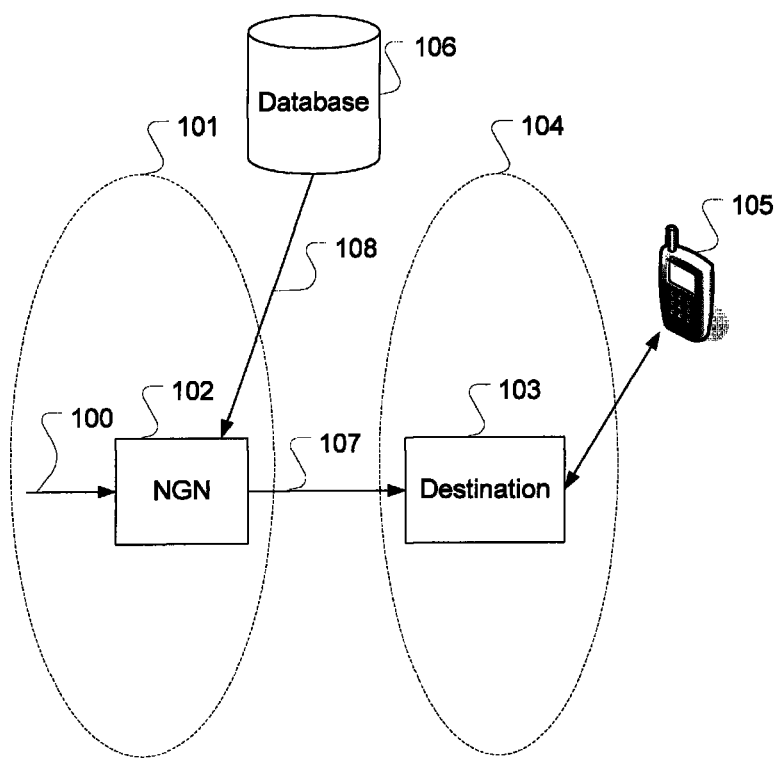
FIG. 1 shows in an embodiment of the invention the method steps executed by the Network Gateway Node (NGN) at call setup.

FIG. 1 shows the main steps of a method for setting up a call 100 from a non-Internet Protocol Multimedia Subsystem (non-IMS) telecommunication network 101 comprising a Network Gateway Node (NGN) 102 to a destination node 103 in an Internet Protocol Multimedia Subsystem (IMS) network 104, the destination node for serving a called terminal 105. The NGN interfaces a combined database node 106 comprising a Home Location Register (HLR) and a Home Subscriber Server (HSS), wherein the NGN routes the call 107 to the destination node in the IMS network. The address is determined by information 108 received from the combined database node 106.

Figure 2:
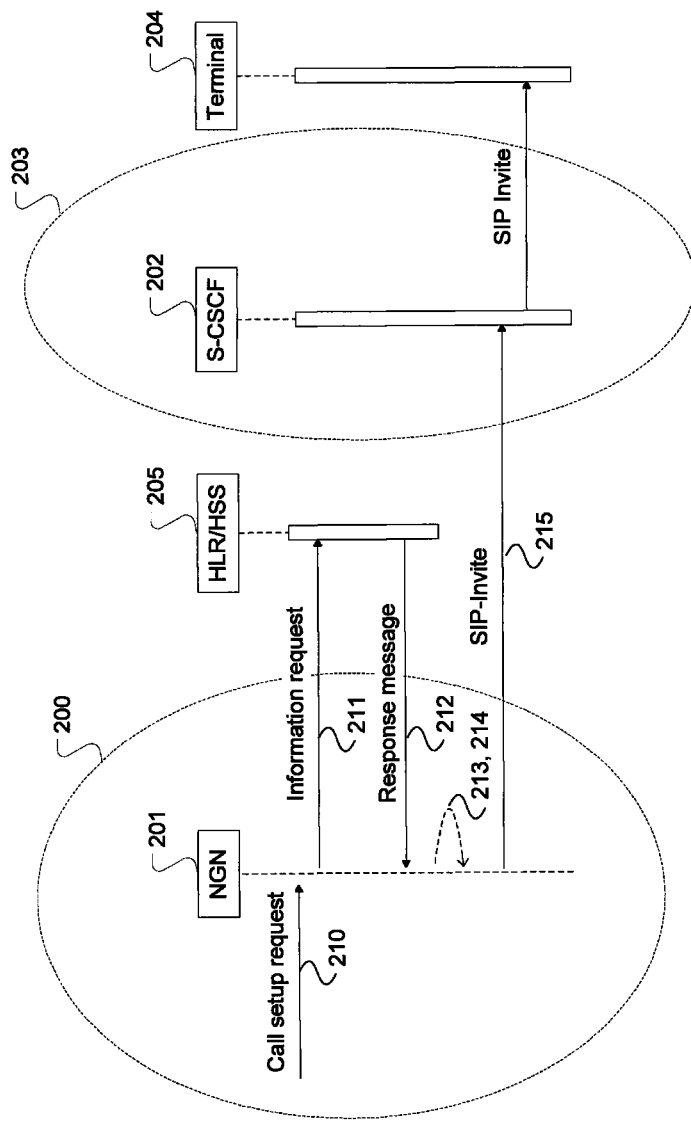
FIG. 2 shows a sequence diagram depicting messages exchanged between the relevant nodes of an exemplary embodiment of the invention executed at call setup.

FIG. 2 shows and embodiment of the invention, wherein the NGN 201 comprises an integrated Gateway Mobile Switching Centre (GMSC) and Media Gateway Control Function (MGCF). If the NGN receives the initial call setup request message 210 requesting a setup of a call it sends, in response to the receiving of the initial call setup request message, an information request message 211 to a combined database node 205, for obtaining routing information for the setup of the call. Such initial call setup request message in a non-IMS network is e.g. the Integrated Services Digital Network (ISDN) User Part (ISUP)-Initial Address Message, ISUP-IAM. The ISUP-IAM comprises the MSISDN of the called terminal.

This integrated node 201 advantageously decreases the number of database node accesses that have to be performed in order to obtain the address of the destination node in the IMS network serving the called terminal. Instead of one database node access by the GMSC and another database node access by the I-CSCF for obtaining routing information for determining the serving node in the IMS network, only one combined database node access by only one node supplies the required routing information. Furthermore, as fewer nodes are involved also less delay is introduced in the setting up of a call.

Subsequently the NGN receives in response to the information request message, a response message 212 comprising routing information for routing the call to the destination node 202. Next, the NGN determines 213 based on the response message an address for routing an IMS type call setup request message 215 to the destination node 202 in the IMS network 203. Next, the NGN generates the IMS type call setup request message 215 under consideration of at least one of the determined address and the initial call setup request message and sends the IMS type call setup request message 215 to the destination node 202 in the IMS network, the destination node identified by the determined address for routing.

The information request message 211 that is sent by the NGN comprises an indicator indicating at least one type of response that the NGN is able to process. Furthermore, based on the address of the NGN the combined database node can also determine, by using a capability table, the capabilities of the NGN.

Based on the received information request message and the determined capabilities of the NGN, the combined database determines the type of response message it will send back to the NGN. A type of request message is the Send Routing Information, SRI. A type of response message is the Send Routing Information-Result, SRI-RES. The content of the response message can be an S-CSCF address or the capability information.

A first type of information request message sent to the combined database node indicates that the NGN is an Integrated NGN and as such the NGN is able to receive and process an S-CSCF address. In the embodiment where the NGN is integrated, that is, the NGN comprises the functionality of the GMSC and the MGCF, the NGN derives from the ISUP-IAM message a Session Initiation Protocol Invite, SIP-Invite, message comprising a Request Uniform Resource Identifier, Request-URI. The Request-URI is a SIP or a Secure SIP, SIPS, URI that identifies a resource that the request is addressed to. The Request-URI is derived from the S-CSCF address resulting that the SIP-Invite message is sent to the S-CSCF node in the IMS network.

A second type of information request message sent to the combined database indicates that the integrated NGN is able to process capability information.

Capability information refers to the capability of the integrated NGN to select from a list of S-CSCFs the S-CSCF that is most appropriate for supporting the call. When the response message comprises the S-CSCF address, the integrated NGN derives the SIP invite message as described above. When the response message comprises the S-CSCF capability information, the integrated NGN processes the S-CSCF capability information to select an S-CSCF node from a pre-configured list, as well called pre-determined list, of S-CSCF nodes that support the required capabilities for the call, and wherein the address for routing is the address of the selected S-CSCF node. The pre-configured list of S-CSCF nodes can be stored on the NGN or in a memory location exterior to the integrated NGN. Furthermore the combined database node comprises a subscriber profile associated with the called terminal. The profile comprises information whether the subscriber has services in the IMS network and whether the called terminal is registered.

If the called terminal is not registered in the IMS network, the combined database node does not have an S-CSCF address for that subscriber. The call may, however, still be routed to the IMS network. The call may be delivered to an S-CSCF, which will then retrieve the user data from the HSS. The S-CSCF may then invoke a terminating unregistered IMS service. The reason for still invoking an IMS service in this case is that the IMS service may apply e.g. call forwarding for the subscriber.

When the combined database node receives a query from the GMSC and it does not have an S-CSCF address of a node serving the called terminal one of the following actions may be taken by the database node (combined HLR-HSS):

The combined database node uses a default S-CSCF address and provides this S-CSCF address to the NGN; the NGN applies call routing towards this S-CSCF as described earlier. The NGN does not know that the called terminal is in fact not IMS registered; the NGN just receives the S-CSCF address and will route the call as described earlier.

The combined database node supplies S-CSCF capabilities indicator to the NGN. The S-CSCF capabilities indicator indicates what capabilities are required for the S-CSCF that shall handle the call. This S-CSCF capabilities indicator is conveyed in a designated parameter in the SRI RES message. The NGN uses the S-CSCF capabilities indicator to select an S-CSCF that supports the required capabilities. The NGN uses a pre-defined list of S-CSCFs for this selection. The sending of S-CSCF capabilities indicator from combined database node to NGN follows a defined principle in IMS wherein an HSS will, when being interrogated by the I-CSCF, for a subscriber for whom the HSS does not have a S-CSCF address registered, send S-CSCF capabilities indicator to this I-CSCF, whereupon this I-CSCF will select a S-CSCF for this call, session or registration, that supports the required capabilities.

The combined database node reverts to regular GSM call handling, entailing e.g. that the HLR obtains a Mobile Station Roaming Number, MSRN, from the Mobile Switching Centre (MSC) where the called subscriber is currently registered. Alternatively, the HLR may in this case return Customized Application Mobile network Enhanced Logic (CAMEL) subscription information to the GMSC, so the GMSC can invoke a CAMEL service, prior to routing the call to the destination MSC.

A rationale of reverting to regular GSM call handling in this case is that an operator may wish to deliver the call to the subscriber's GSM phone without routing the call through IMS, since the subscriber is not registered in IMS anyway.

In another embodiment of the invention the NGN comprises a GMSC operatively connected to a MGCF and to the combined database node. The interconnection between the GMSC and the MGCF can e.g. be ISUP, running over SS7. Advantageously the GMSC in this embodiment can be connected to one or a plurality of MGCFs. If a plurality of MGCFs is used, the GMSC can select the most appropriate MGCF to route the call to, e.g. the MGCF that involves the least delay. The GMSC receives an initial call setup request message requesting a setup of the call, wherein the initial call setup request message comprises an identification of the called terminal. It sends, in response to the receiving of the initial call setup request message, an information request message to a combined database node, for obtaining routing information for the setup of the call. Subsequently it receives in response to the information request message, a response message comprising routing information for routing the call to the destination node and based on the response message determines an address for routing an ISUP-IAM type call setup request message to a MGCF. Finally it generates the ISUP-IAM type call setup request message under consideration of at least one of the determined addresses and the initial call setup request message and sends the ISUP-IAM type call setup request message to the MGCF.

To route the call setup message to a serving node in the IMS network, the GMSC function of the NGN only needs to know the address of the S-CSCF. As ISUP is used on the interconnection between the GMSC and the MGCF the Network Routing Number, NRN, or capabilities required of the S-CSCF are used for routing the call setup request message to the MGCF.

Advantageously the GMSC processes the received response message that comprises an S-CSCF capability information to select an S-CSCF node from a pre-configured list of S-CSCF nodes that support the required capabilities for the call, and wherein the step of sending uses the address of the selected S-CSCF node. The GMSC uses the S-CSCF capabilities indicator to select an S-CSCF that is best fit for supporting the required capabilities for the call. The GMSC uses a preconfigured list of S-CSCFs for this selection.

As a first choice the GMSC could for example select the S-CSCF node that supports all the required capabilities for the call. If the selected S-CSCF node is not available (e.g. malfunctioning) the GMSC could select the next most appropriate S-CSCF node. The GMSC sends an ISUP-IAM type call setup request message to the MGCF using the NRN of the selected S-CSCF node. As described above the MGCF sends a SIP-Invite derived from the ISUP-IAM [MSISDN] to the selected S-CSCF node.

If the GMSC is connected to a plurality of MGCFs, the route to the selected S-CSCF can go through one of the plurality of MGCF. The GMSC selects the most appropriate path that might be for example, the shortest, or the one incurring in the least delay. In this embodiment the protocol used for interconnecting the GMSC with the MGCF is ISUP, which may be based on the SS7 standard or may be based on signaling over IP. This protocol does not support the sending of an S-CSCF address or host name of the S-CSCF.

If the received response message from the combined database comprises an S-CSCF address, the GMSC processes the received response message and uses the address of the S-CSCF node to determine the destination. The S-CSCF address in this case is formatted as a NRN. The ISUP-IAM generated by the GMSC contains in this case a combination of the NRN and the MSISDN of the called terminal.

The MGCF on receiving an ISUP-IAM type call setup request message from the GMSC for setting up a call to a destination node generates an IMS type call setup request message under consideration of the received ISUP-IAM type call setup request message. It sends an IMS type call setup request message, for example a SIP-Invite, to the destination node in the IMS network. The destination node that serves the called terminal is the selected S-CSCF.

If the called terminal is not registered in the IMS network, the combined database node does not have an S-CSCF address for that subscriber and the non-integrated NGN will handle the non-registered terminal in a similar way as described in the case of an integrated NGN. The exception being that instead of the combined database node returning a default S-CSCF address, it returns a default NRN.

Figure 3:
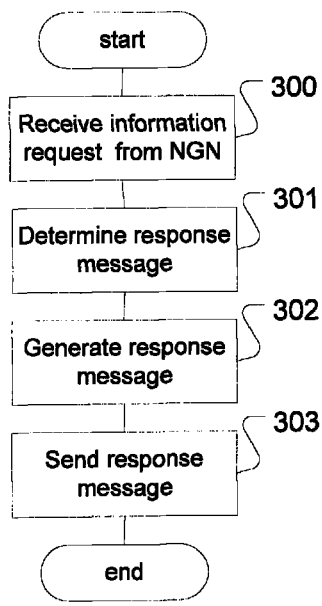
FIG. 3 shows the main method steps performed by the combined database node comprising a combined Home Location Register (HLR) and Home Subscriber Server (HSS) at call setup.

The invention further proposes a method for supporting setting up a call from a non-IMS, telecommunication network comprising a NGN, to a destination node in an IMS network, the destination node for serving a called terminal of a subscriber. The NGN interfaces a combined database node comprising an HLR and an HSS. Furthermore the combined database comprises a subscriber profile associated with the called terminal. The combined database performs the following steps. The main method steps executed at the combined database node are shown in FIG. 3. The combined database node receives an information request message 300 that comprises an identification of the called terminal e.g. the MSISDN for obtaining routing information for supporting the setup of the call. It determines a response message 301 based on at least one capability of the NGN and subscriber information from the subscriber profile, generates a response message 302 under consideration of the determined at least one capability of the NGN and the determined information from the subscriber profile, and sends the response message 303 to the NGN. The subscriber profile indicates the type of services the subscriber has, e.g. call forwarding, personal greeting service, charging tariffs, IMS subscription, etc. It also has information if the subscriber terminal is registered or not.

Figure 4A:
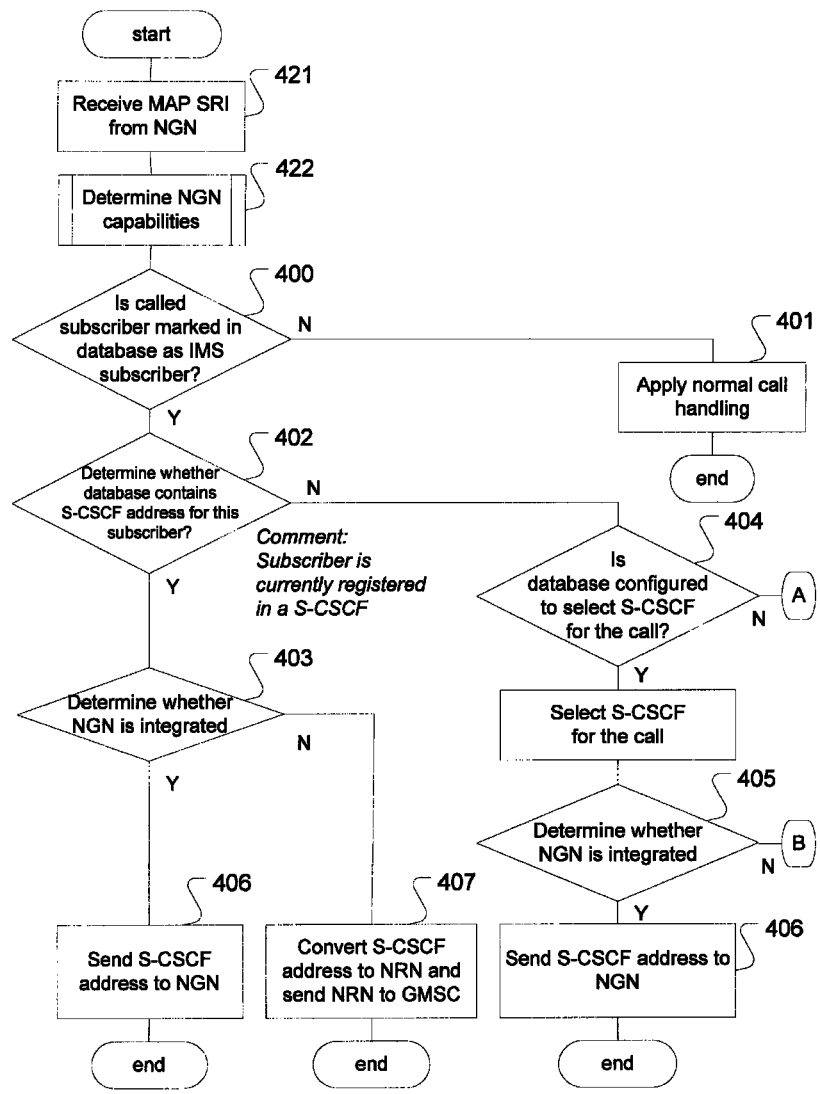
FIG. 4a shows a first part of the flow diagram of the detailed method steps executed by the combined database node comprising an HLR and an HSS at call setup.
Figure 4B:
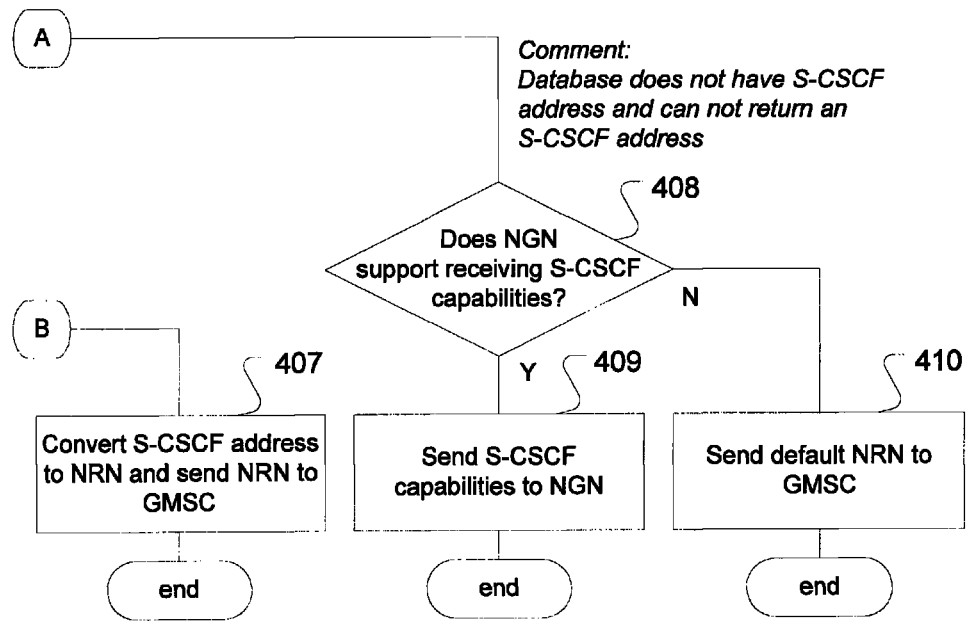
FIG. 4b shows the second part of the flow diagram of the method steps executed by the combined database node comprising an HLR and an HSS at call setup.
Figure 5:
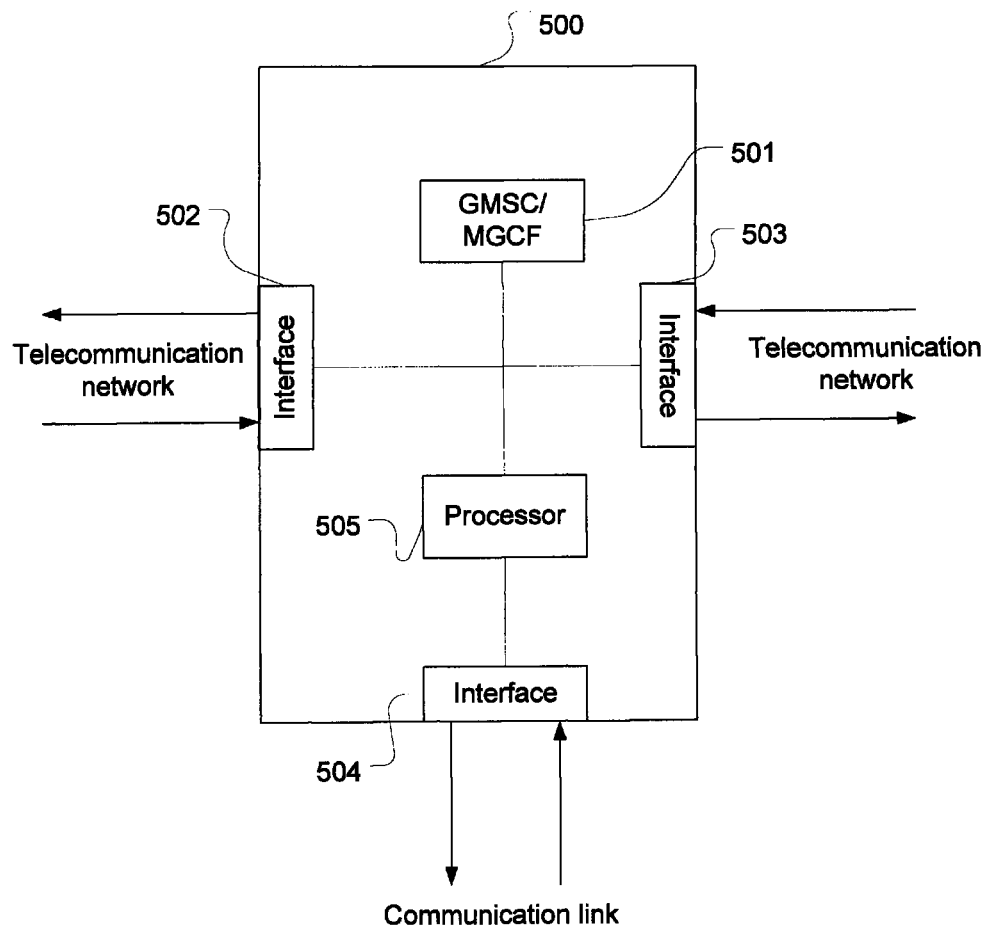
FIG. 5 shows a block diagram of an embodiment of an integrated NGN comprising a Gateway Mobile Switching Center (GMSC) and Media Gateway Control Function (MGCF) according to the invention.
Figure 6:
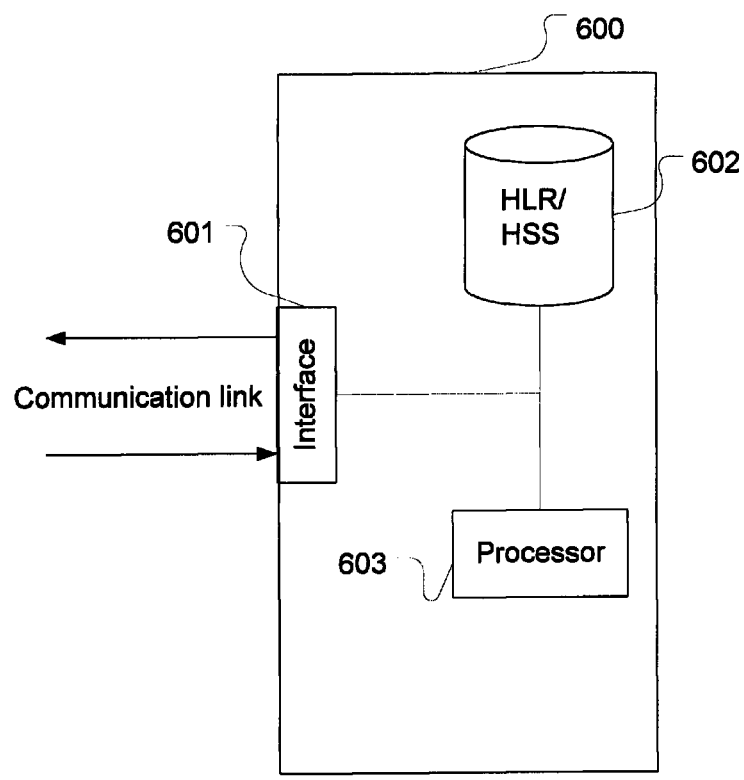
FIG. 6 shows a block diagram of an embodiment of a combined database node according to the invention.

FIGS. 4a and 4b show in more detail the method steps executed by the combined database node. FIG. 4a shows the start of the method steps. The combined database node receives as indicated earlier, an information request message, Mobile Application Part (MAP) SRI, 420 from the NGN and then it determines 421 the capabilities of the NGN. The combined database node can derive implicitly from the address of the NGN the capabilities of the NGN using a capability table. Subsequently the combined database node generates the response message comprising the step of determining 400 whether the called terminal is an IMS subscriber. The subscriber profile associated with the called terminal comprises information indicating whether the called terminal has an IMS subscription. If the called terminal is not an IMS subscriber, then normal call handling 401 will take place, that is, the combined database node sends e.g. a Mobile Station Roaming Number, MSRN or a Terminating-Call Camel Subscription Information, T-CSI, code to the NGN.

If it is determined that the called terminal is an IMS subscriber, the combined database node will before generating the response message determine 402 whether the combined database node contains an S-CSCF address of the destination node. Furthermore, if it is determined that the combined database node contains an S-CSCF address of the destination node, the combined database node will before generating the response message determine 403 whether the at least one capability indicates that the NGN comprises an integrated GMSC-MGCF. The supported capability of the NGN may be indicated explicitly in message 300, or may be derived from the address of the NGN, by using a capability table.

Subsequently, if it is determined that the combined database node does not contain an S-CSCF address of the destination node, the combined database node will before generating the response message determine 404 whether the combined database node is configured to select an S-CSCF address for the destination node.

The combined database node does not contain an S-CSCF address of the destination node if the called terminal has not been registered, for example if it is switched-off. Furthermore, if it is determined that the combined database does not contain a S-CSCF address of the destination node, the combined database node will before generating the response message determine 405 whether the at least one capability indicates that the NGN comprises an integrated GMSC-MGCF.

Then, if it is determined that the at least one capability indicates that the NGN comprises an integrated GMSC-MGCF, the combined database node will before generating 406 the response message, include the S-CSCF address in the response message. A NGN with integrated GMSC-MGCF functionality is capable to receive an S-CSCF address. If it is determined that the at least one capability indicates that the NGN does not comprise an integrated GMSC-MGCF, the combined database node will before generating 407 the response message convert the S-CSCF address to a NRN, and include the NRN in the response message. As the NGN is not integrated the GMSC part can only route the call setup request message using the NRN.

Furthermore if it is determined that the combined database node does not contain an S-CSCF address of the destination node, the combined database node will before generating the response message determine 408 whether the at least one capability indicates that the NGN is configured to receive S-CSCF capabilities. If it is determined that the NGN is configured to receive S-CSCF capabilities, the combined database node will before generating the response message include the required S-CSCF capabilities in the response message 409. The required S-CSCF capabilities will be used by the NGN to select an S-CSCF node from a pre-configured list of S-CSCF nodes that support the required capabilities for the call. Then, if it is determined that the NGN is not configured to receive S-CSCF capabilities, the combined database node will before generating the response message include the default NRN in the response message 410.

The invention further proposes a NGN, 500 for operating in a non-IMS telecommunication network for setting up a call towards a destination node in an IMS network, the destination node serving a called terminal. The NGN comprises a GMSC function 501 and a MGCF 501 wherein the NGN comprises a first network interface 502 to a telecommunication network for receiving call setup request messages. The NGN further comprises a second network interface 503 to a telecommunication network for sending an IMS type setup request messages, a combined database node interface 504 to a combined database node which comprises an HLR and an HSS for requesting routing information and receiving response messages, and a processor 505 for determining based on the received response message an address for routing the IMS type call setup request message to the destination node in the IMS network.

Finally, the invention proposes a combined database node 600 for supporting setting up a call from a non-IMS, telecommunication network comprising a NGN to a destination node in an IMS network, the destination node for serving a called terminal of a subscriber. The combined database node comprises an interface 601 towards the NGN. The combined database node further comprises an HLR 602 and an HSS 602, means for receiving an information request message comprising an identification of the called terminal, for requesting and obtaining routing information, processor means 603 for determining at least one capability of the NGN, means for generating a response message under consideration of the determined at least one capability of the NGN, and means for sending the response message to the NGN. The means for receiving, means for determining, means for generating and means for sending can be either implemented as software or as hardware or as a combination of software and hardware in the combined database node according to the present invention.

The invention claimed is:

1. A method for setting up a call from a non-Internet Protocol Multimedia Subsystem (non-IMS) telecommunication network, comprising a Network Gateway Node (NGN), to a Serving Call Session Control Function (S-CSCF) serving a called terminal in an Internet Protocol Multimedia Subsystem (IMS) network, wherein the NGN executes steps comprising:
   sending, in response to receiving an initial call setup request message in the non-IMS telecommunication network, an information request message to a combined database node comprising a Home Location Register (HLR) and a Home Subscriber Server (HSS) for obtaining routing information for a setup of the call, the information request message comprising an indicator indicating that the NGN is an integrated NGN configured with a Gateway Mobile Switching Center (GMSC) portion operatively connected to a Media Gateway Control Function (MGCF) portion that interfaces the non-IMS telecommunication network with the IMS network;
   receiving from the combined database node, a response message including one of:
      an address of the S-CSCF serving the called terminal; and
      S-CSCF capability information indicating S-CSCF capabilities required for the call; and
   when the response message includes the address of the S-CSCF serving the called terminal, routing the call directly to the S-CSCF that serves the called terminal in the IMS network.

2. The method according to claim 1, wherein the NGN executes steps further comprising:
   receiving the initial call setup request message requesting the setup of the call, wherein the initial call setup request message includes an identification of the called terminal;
   generating an IMS-type call setup request message; and
   sending the IMS-type call setup request message to the S-CSCF in the IMS network.

3. The method according to claim 1, wherein the indicator indicates that the NGN is able to process at least one of the S-CSCF capability information and the S-CSCF address.

4. The method according to claim 1, wherein the GMSC portion executes steps comprising:
   in response to receiving the response message from the combined database node, determining, based on the response message, an address for routing an Integrated Services Digital Network (ISDN) User Part (ISUP), Initial Address Message (ISUP-IAM) type call setup request message to the MGCF portion;
   generating the ISUP-IAM type call setup request message; and
   sending the ISUP-IAM type call setup request message to the MGCF portion.

5. The method according to claim 4, wherein the GMSC portion processes the response message comprising the S-CSCF address.

6. The method according to claim 1, wherein when the response message includes the S-CSCF capability information, the NGN performs further steps comprising:
   utilizing the S-CSCF capability information to select an S-CSCF having the capabilities required for the call; and
   routing the call directly to the selected S-CSCF.

7. The method according to claim 6, wherein the NGN selects the selected S-CSCF from a pre-configured list of S-CSCFs that support capabilities for the call.

8. The method according to claim 7, wherein the GMSC portion selects the S-CSCF from the pre-configured list of S-CSCFs.

9. A Network Gateway Node (NGN) for operating in a non-Internet Protocol Multimedia Subsystem (non-IMS)

telecommunication network for setting up a call towards a Serving Call Session Control Function (S-CSCF) serving a called terminal in an Internet Protocol Multimedia Subsystem (IMS) network, the NGN comprising:
- a Gateway Mobile Switching Centre (GMSC) portion;
- a Media Gateway Control Function (MGCF) portion operatively connected to the GMSC portion;
- a first network interface from the GMSC portion to the non-IMS telecommunication network for receiving call setup request messages;
- a second network interface from the MGCF portion to the IMS network for sending IMS-type setup request messages;
- a combined database node interface to a combined database node comprising a Home Location Register (HLR) and a Home Subscriber Server (HSS) for requesting routing information and for receiving a response message;
- wherein the NGN is arranged to send, in response to receiving an initial call setup request message, an information request message via the combined database node interface for obtaining the routing information for a setup of the call, the information request message comprising an indicator indicating that the NGN is an integrated NGN able to receive and process an S-CSCF address; and
- a processor for determining, based on the response message, an address for routing an IMS type call setup request message to the S-CSCF serving the called terminal in the IMS network;
- wherein the NGN is arranged to route the call directly to the S-CSCF serving the called terminal in the IMS network, based on the determined address.

10. The NGN according to claim 9, wherein the response message from the combined database node includes S-CSCF capability information indicating S-CSCF capabilities required for the call, and the NGN is configured to:
- utilize the S-CSCF capability information to select an S-CSCF having the capabilities required for the call; and
- route the call directly to the selected S-CSCF.

11. The NGN according to claim 10, wherein the NGN is configured to select the selected S-CSCF from a pre-configured list of S-CSCFs that support capabilities for the call.

12. A method in a combined database node for supporting setting up a call from a non-Internet Protocol Multimedia Subsystem (non-IMS) telecommunication network comprising a Network Gateway Node (NGN) to a Serving Call Session Control Function (S-CSCF) serving a called terminal of a subscriber in an Internet Protocol Multimedia Subsystem (IMS) network, wherein the combined database node comprises a Home Location Register (HLR) and a Home Subscriber Server (HSS) and interfaces with the NGN, the combined database node storing a subscriber profile associated with the called terminal, wherein the method comprises:
- receiving an information request message from the NGN, the information request message comprising an identification of the called terminal for obtaining routing information for supporting a setup of the call, and an indicator indicating that the NGN is an integrated NGN configured with a Gateway Mobile Switching Center (GMSC) portion operatively connected to a Media Gateway Control Function (MGCF) portion that interfaces the non-IMS telecommunication network with the IMS network;
- generating a response message including one of:
  - an address of the S-CSCF serving the called terminal; and
  - S-CSCF capability information indicating S-CSCF capabilities required for the call; and
- sending the response message to the NGN.

13. The method according to claim 12, wherein the step of generating the response message comprises determining from the subscriber profile whether the called terminal is an IMS subscriber, and when it is determined that the called terminal is an IMS subscriber, the step of generating the response message includes determining whether the combined database node provides the address of the S-CSCF serving the called terminal.

14. The method according to claim 13, wherein when it is determined that the combined database node does not provide the address of the S-CSCF serving the called terminal, the step of generating the response message includes determining whether the combined database node is configured to select an S-CSCF having capabilities required for the call.

15. The method according to claim 14, wherein when it is determined that the combined database node is not configured to select an S-CSCF, the step of generating the response message includes determining whether the NGN is configured to receive S-CSCF capabilities and select an S-CSCF having capabilities required for the call.

16. The method according to claim 15, wherein when it is determined that the NGN is configured to receive the S-CSCF capabilities, the step of generating the response message includes including the S-CSCF capabilities in the response message.

17. A combined database node for supporting setting up a call from a non-Internet Protocol Multimedia Subsystem (non-IMS) telecommunication network comprising a Network Gateway Node (NGN) to a Serving Call Session Control Function (S-CSCF) serving a called terminal of a subscriber in an Internet Protocol Multimedia Subsystem (IMS) network, the combined database node comprising:
- a receiving interface configured to receive an information request message from the NGN, the information request message comprising an identification of the called terminal for requesting and obtaining routing information;
- a Home Location Register (HLR) and a Home Subscriber Server (HSS); and
- wherein the information request message also includes an indicator indicating that the NGN is an integrated NGN configured with a Gateway Mobile Switching Center (GMSC) portion operatively connected to a Media Gateway Control Function (MGCF) portion that interfaces the non-IMS telecommunication network with the IMS network;
- wherein the combined database node is configured to:
- generate a response message including one of:
  - an address of the S-CSCF serving the called terminal; and
  - S-CSCF capability information indicating S-CSCF capabilities required for the call; and
- send the response message to the NGN.

\* \* \* \* \*